United States Patent [19]

Coppock et al.

[11] 4,339,821
[45] Jul. 13, 1982

[54] ACOUSTO-OPTIC MODE-LOCKED LASER

[75] Inventors: Richard A. Coppock, San Jose; Edward D. Reed, Sunnyvale, both of Calif.

[73] Assignee: GTE Products Corporation, Stamford, Conn.

[21] Appl. No.: 155,985

[22] Filed: Jun. 3, 1980

[51] Int. Cl.³ .............................................. H01S 3/098
[52] U.S. Cl. ....................................... 372/18; 372/26; 350/358
[58] Field of Search .................. 350/358; 331/94.5 M, 331/94.5 ML, 94.5 Q

[56] References Cited

U.S. PATENT DOCUMENTS

| | | | |
|---|---|---|---|
| 3,944,335 | 3/1976 | Saito et al. | 350/358 |
| 4,019,155 | 4/1977 | Gorog et al. | 350/358 |
| 4,126,834 | 11/1978 | Coppock | 350/358 |

Primary Examiner—William L. Sikes
Attorney, Agent, or Firm—John F. Lawler

[57] ABSTRACT

An acousto-optic mode-locked laser comprises a piezoelectric, acousto-optic crystal disposed within the cavity of a laser in the path of the laser beam, and a radio-frequency energized interdigital transducer (IDT) array coupled to the crystal so as to launch bulk shear waves in the crystal for a limited number of interactions with the laser beam. The IDT is mounted on a first plane surface of the crystal opposite from a second plane surface thereof which is disposed at an acute angle $\theta$ to the first surface and which is nominally parallel to the laser beam. Bulk shear waves are launched in the crystal by the IDT at the first surface at the angle $\theta$ to a normal to that surface with the forward wave traversing the laser beam perpendicular to its axis and being reflected back through the beam by the opposite or second crystal surface to form standing waves which modulate the beam. This reflected wave thereafter is reflected by the first surface out of the interaction zone so as to be ineffective in establishing additional standing waves. Optimum efficiency of shear wave generation is achieved when $$df = v_l \qquad (1)$$

where d is the finger period of the IDT, f is the frequency of the microwave source, and $v_l$ is the velocity of the acoustic longitudinal wave.

5 Claims, 5 Drawing Figures

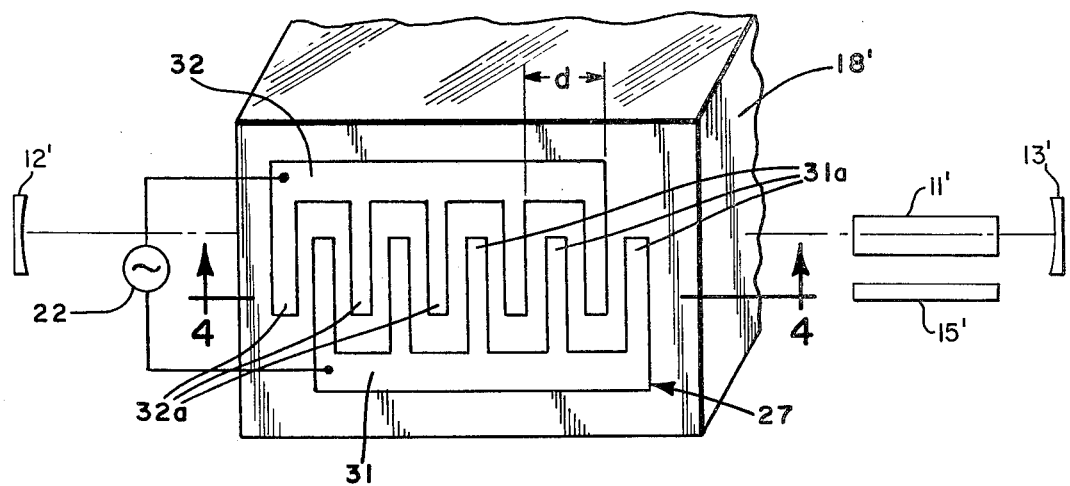
F I G. 3
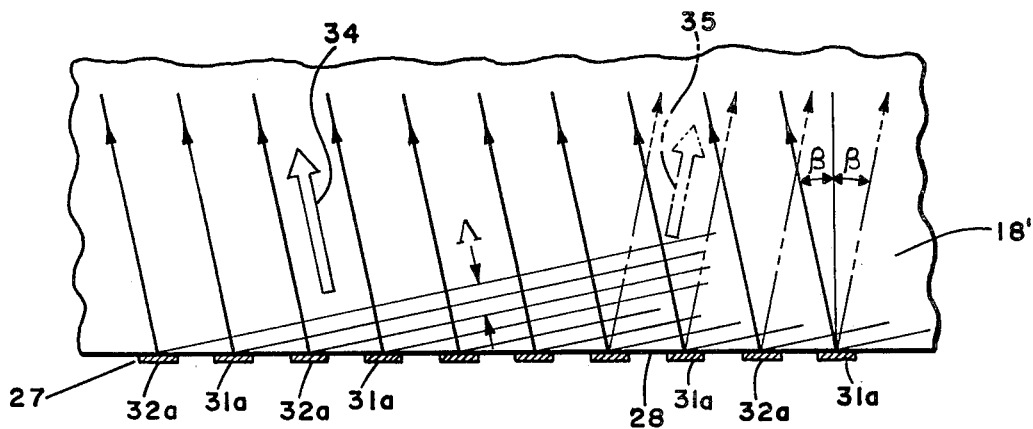
F I G. 4
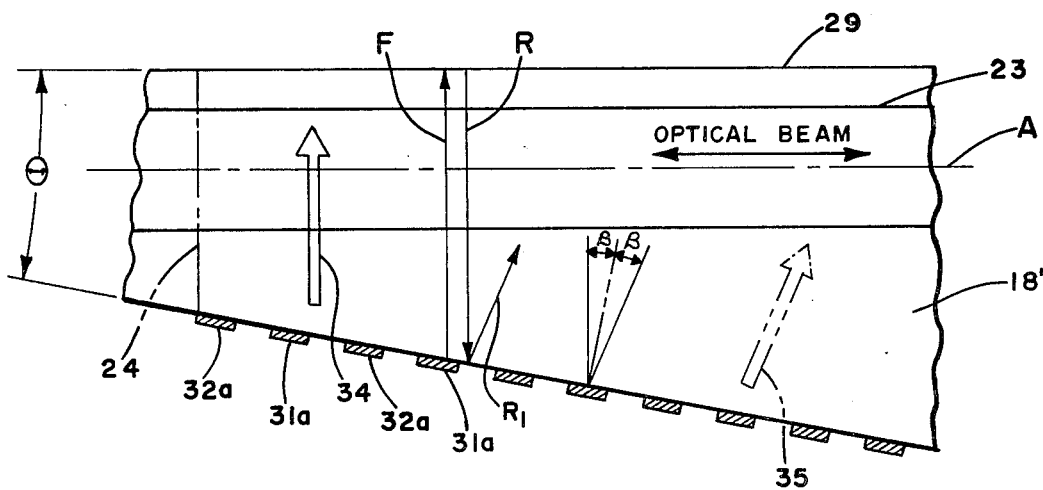
F I G. 5

ACOUSTO-OPTIC MODE-LOCKED LASER

BACKGROUND OF THE INVENTION

This invention relates to an improved mode-locked laser.

Prior art locking of longitudinal modes in a continuous wave laser is commonly accomplished by intracavity loss or phase modulation with an acousto-optic cell as described in U.S. Pat. Nos. 3,947,780 of Rice et al. and 3,648,193 of Foster et al. The acoustic standing waves function as an optical shutter, diffracting sufficient light to maintain the laser below oscillation threshold except during nodes or nulls. If the time between the acoustic nulls (shutter open) corresponds to the laser round-trip time, the laser axial modes are locked to form a temporally compressed packet of circulating energy.

In order to achieve low-loss modulation, the acoustic nulls formed by interference between forward and reflected waves within the crystal of the cell must be deep. This constraint requires a high acoustic Q in the cell configuration and this in turn depends upon both low acoustic attenuation and, ordinarily, an acoustic round-trip path length which is an integral number of acoustic wavelengths. Since the cell path is temperature dependent, the latter condition is difficult to maintain. If the mode-locking drive frequency for the cell is externally constrained, the fabrication of the device is further complicated.

This invention is directed to a solution of this problem.

OBJECTS AND SUMMARY OF THE INVENTION

A general object of this invention is the provision of a mode-locked laser with an improved acousto-optic cell that substantially increases the efficiency of the system.

A further object is the provision of such a laser with an acousto-optic cell that is temperature independent.

Still another object is the provision of an acousto-optic cell which achieves the above objects simply and economically.

A further object is the provision of a technique for operating such a laser with increased efficiency in converting electrical energy into acoustic energy, thereby improving efficiency of the system.

These and other objects of the invention are achieved with a laser system having an acousto-optic crystal in which standing acoustic waves which interact with the laser beam are limited to those generated in the crystal by the initial forward wave launched by the transducer and the first reflected wave. The invention further comprehends the discovery of a technique for operating the acoustic transducer in a condition which provides maximum efficiency in propagating the acoustic waves in the crystal.

DESCRIPTION OF THE DRAWINGS

FIG. 3 depicts a laser system with a perspective view of one end of the crystal embodying this invention showing an IDT array used for launching acoustic waves in the crystal;

FIG. 4 is a schematic representation of the operation of the IDT array in generating bulk shear waves in the crystal; and FIG. 5 is a schematic elevational view of part of the crystal embodying this invention showing the angular relation of the transducer and the crystal surface on which it is mounted to the laser beam axis and to the opposite reflecting surface of the crystal.

DESCRIPTION OF PREFERRED EMBODIMENT

Figure 1:
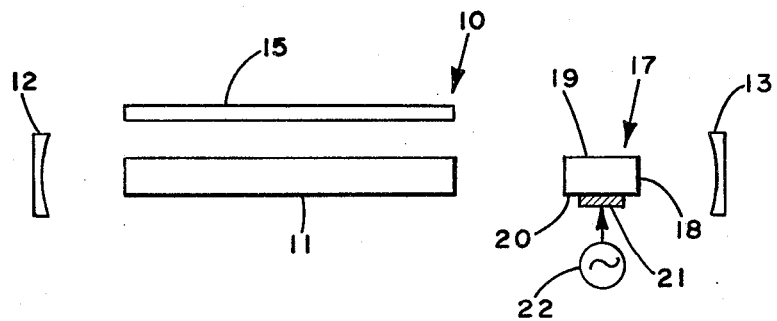
FIG. 1 is a schematic representation of a prior art mode-locked laser.

Referring now to the drawings, FIG. 1 depicts a mode-locked laser 10 comprising active laser material 11 located in an optical resonant cavity defined by mirrors 12 and 13 which are spaced from opposite ends of the laser material. The laser material may, by way of example, be a cylindrical rod of yttrium aluminum garnet doped with neodymium. Light rays from an optical pump source 15 excite the neodymium atoms to produce a population inversion and lasing in the rod 11. The pump source may be a tungsten filament or an arc lamp that is operated continuously.

An acousto-optic modulator 17 is also located in the laser cavity and is axially aligned with the laser rod and the mirrors. Modulator 17 comprises an acousto-optic body 18 having plane parallel side surfaces 19 and 20. A transducer 21 is bonded to surface 20 of body 18 and is electrically connected to a modulation source 22 which, by way of example, may comprise a tunable radio frequency oscillator producing a variable frequency sinusoidal modulation voltage. In order to mode lock the laser, the modulation frequency is tuned to the laser intermode frequency $c/2L$ where c is velocity of light and L is the cavity length.

Figure 2:
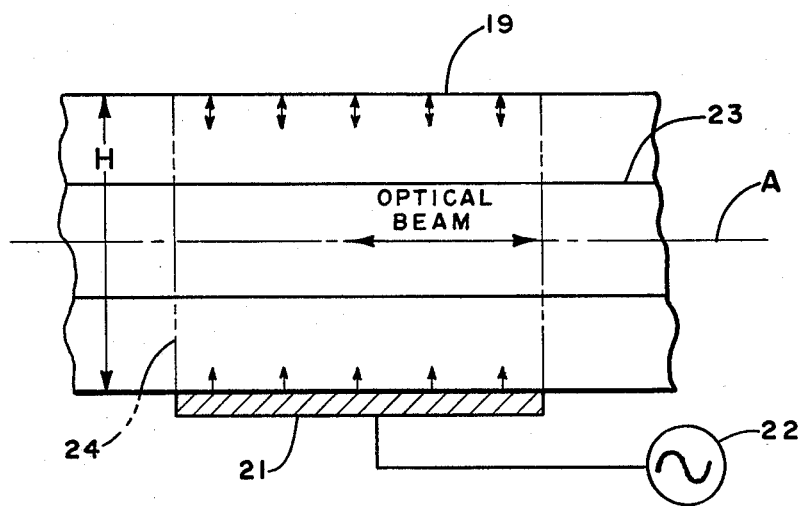
FIG. 2 is an enlarged view of part of the acousto-optic crystal of FIG. 1 showing the conventional technique for producing acoustic standing waves in the crystal.

A better understanding of the invention may be had from an explanation of the interaction between acoustic waves generated in crystal 18 by transducer 21 and the optical beam 23, hereinafter designated as the interaction zone 24, see FIG. 2. Mode locking of the optical beam is caused by the standing acoustic waves resulting from acoustic waves propagating between the parallel side surfaces 19 and 20 of the crystal. More particularly, the acoustic wave initially is generated at surface 20 by transducer 21, travels upwardly (as viewed in FIG. 2), is reflected from surface 19 downwardly as viewed, and subsequently is continuously reflected between these surfaces. Standing waves result from the interaction of forward waves (propagating upwardly) and reflected waves (propagating downwardly) within the crystal. This produces time-dependent acoustic nodes or nulls which function as optical windows or shutters to pass the laser beam. Since the dimension H between crystal surfaces 19 and 20 normally is substantially greater, typically hundreds of times greater than the wavelength of the transducer energizing source 22, there are as many acoustic wavelengths between these crystal surfaces, the number being a function of the velocity of the wave in the crystal. As the forward and reflected waves continuously interact, the relative locations of the nodes formed by each pair of waves becomes spatially offset as a result of wave velocity changes caused by even the slightest of temperature changes of the crystal. The effect of these unaligned nodes is a partial block of the laser beam causing a loss of laser energy, termed a "d-c loss", and thereby impairing the efficiency of the system. In order to maintain an integral number of acoustic waves in the crystal and thus minimize this d-c loss, precise control of the temperature and thickness of the crystal is required. Such temperature and thickness controls are difficult and expensive to achieve.

The above problems are overcome, in accordance with this invention, by utilizing an acoustic wave launcher in the form of an IDT array 27, see FIGS. 3, 4 and 5, mounted on the side surface 28 of a crystal 18' which lies in a plane disposed at an angle $\theta$ with respect to the opposite reflecting side surface 29 of the crystal. The mirrors, lasing medium and pump source of the laser system are the same as described above and are identified in FIG. 3 by the primes of the reference characters of these components. IDT 27 comprises a first electrode 31 having a plurality of laterally spaced parallel fingers 31a and a second electrode 32 with the same number of similarly arranged fingers 32a interleaved with fingers 31a. Electrodes 31 and 32 are connected to opposite terminals of radio-frequency energizing source 22. The crystal is oriented with respect to laser beam 23 with crystal surface 29 parallel to the axis A of the beam as shown in FIG. 5. When the IDT is energized, acoustic waves are launched from surface 28 upwardly (as viewed) and are reflected by surface 29 as described in greater detail below.

IDT 27 is a conductor such as gold formed as a single layer on the body surface by well known thin-film deposition techniques. This transducer is utilized in a bulk wave Bragg cell described in U.S. Pat. No. 4,126,834 issued to R. A. Coppock.

As described in U.S. Pat. No. 4,126,834, transducer 27 generates bulk shear waves in the body of crystal 18', the directions of propagation of these waves being indicated at 34 and 35 in FIGS. 4 and 5, the propagation directions 34 and 35 being given by $$\beta = \sin^{-1}(\Lambda/d) \tag{2}$$

where $\beta$ is the angle of propagation of the acoustic beams relative to a normal to the launching surface, $\Lambda$ is the acoustic wavelength and d is electrode array period. Two first-order composite beams are formed symmetrically about the normal to the surface 28. This angle $\beta$ is also equal to the angle $\theta$ between the planes of surfaces 28 and 29 of crystal 18' as shown in FIG. 5.

The operation of this configuration of crystal 18' and the IDT array 27 is illustrated in FIG. 5. The transducer simultaneously generates acoustic beams in directions 34 and 35 as described above. However, acoustic beams propagating in direction 35 are not effective in establishing standing waves in the crystal because their angle of incidence on crystal surface 29 is $2\theta$ (or $2\beta$) and they are reflected thereby out of the interaction zone. The other direction 34 in which the acoustic beams propagate, however, is perpendicular to crystal surface 29, as shown, so that the forward wave F travelling in this direction and the reflected wave R are parallel and coincident and therefore establish standing waves in the interaction zone 24. When wave R impinges on crystal surface 28, however, its angle of incidence is $\theta$ and it is therefore reflected as wave $R_1$ at a reflection angle $\theta$ so as to propagate out of the interaction zone with no further effect in establishing standing waves. In other words, the specified angular relationship of opposite surfaces 28 and 29 of the crystal limits the establishment of standing waves in the interaction zone to one round-trip of the acoustic beam through it. This eliminates pollution of the standing waves by subsequent reflections and the need to align additional nodes.

At a frequency f of the electrical drive source 22, shear acoustic waves are launched at an angle $\beta_s$ with respect to a normal to the launching plane as given by the equation:

$$d \sin \beta_s = v_s/f \tag{3}$$

where $v_s$ is the velocity of the acoustic shear wave. If the frequency is too low so that no solution for $\beta_s$ in this equation exists, the shear wave will not be launched. There is a similar equation for the other type of acoustic wave that can be generated, the longitudinal wave:

$$d \sin \beta_l = v_l/l \tag{4}$$

where $v_l$ is the velocity of the longitudinal wave and which is always larger than $v_s$. The result is that $\beta_l$ is always larger than $\beta_s$ for a given frequency f.

We have discovered that maximum efficiency of the system is realized when the shear wave is launched at a frequency f by a transducer having interdigital period d which satisfies the following equation:

$$df = v_l. \tag{5}$$

This corresponds to the longitudinal wave being launched parallel to the IDT launching plane. When d and f obey this equation, the IDT becomes a very efficient converter of electrical energy into acoustic energy. Thus, for maximum efficiency, the unit operates at the single frequency which satisfies this equation.

By way of example, a mode-locked laser embodying this invention having the following features and performance characteristics was constructed and operated with satisfactory results:

| Laser material | Nd:YAG |
| --- | --- |
| Operating wavelength | 1.064 μm |
| Cell 18' | |
| Material | Barium sodium niobate |
| Λ | 14.8 μm |
| θ | 40° |
| d | 23 μm |
| f | 250 MHz |

What is claimed is:

1. In laser apparatus having a lasing medium, means to energize said medium whereby to produce a coherent light beam at a predetermined wavelength, spaced reflector means communicating with said beam and defining the laser cavity, the improvement of means for mode locking the laser beam comprising a piezoelectric acoustic-optic crystal in the path of said beam and traversed thereby along an axis, said crystal having first and second plane surfaces coextensive with said axis, said first surface being parallel with said axis, the plane of said second surface being disposed at an angle $\theta$ to the plane of the first surface, an interdigital transducer formed on said second surface, said transducer having a plurality of interleaved fingers having a period d, a source of radio-frequency energy connected to said transducer whereby said transducer launches bulk acoustic shear waves in said crystal in a direction perpendicular to said beam for interaction therewith and defining an interaction zone, said shear waves being reflected by said first surface back through said beam to said second surface for reflection thereby out of said interaction zone.

2. Laser apparatus according to claim 1 in which said transducer also launches bulk acoustic longitudinal waves in said crystal transversely of said shear waves, said source having a frequency which satisfies the relation $$df = v_l \qquad (6)$$

where f is the frequency of the source and $v_l$ is the velocity of said longitudinal wave.

3. In laser apparatus having an output beam of coherent light, means for mode locking said beam comprising an acousto-optic crystal in the path of said beam, and means for propagating bulk acoustic shear waves in said crystal for traversing said beam no more than twice.

4. The mode locker means according to claim 3 in which said crystal has first and second plane surfaces, said second surface being parallel to said beam, means mounted on said first surface for launching said shear waves in a direction substantially perpendicular to said beam and said first surface, said first and second surfaces being disposed at an acute angle relative to each other.

5. An acousto-optic device adapted to be traversed by the beam of a laser for mode locking the output of the laser comprising
a piezoelectric crystal having first and second plane surfaces, said surfaces being formed at an acute angle $\theta$ to each other, and
an IDT array on one of said surfaces adapted to be energized by a sinusoidally varying voltage whereby to launch bulk acoustic shear waves in said crystal at an angle $\beta$ relative to a normal to said one of said surfaces for interaction with said laser beam,
said IDT array comprising two electrodes, each electrode having a plurality of fingers, said fingers of said electrodes being interleaved with the array period corresponding to a distance d, said angle $\beta$ being defined by $$\beta = \sin^{-1}(\Lambda)/d \qquad (7)$$

where $\Lambda$ is the wavelength of said acoustic waves, said angle $\beta$ being equal to said angle $\theta$.

* * * * *